Nov. 9, 1943.  D. M. SMITH  2,333,690
RING EXPANDER
Filed Jan. 6, 1940
FIG. 1.
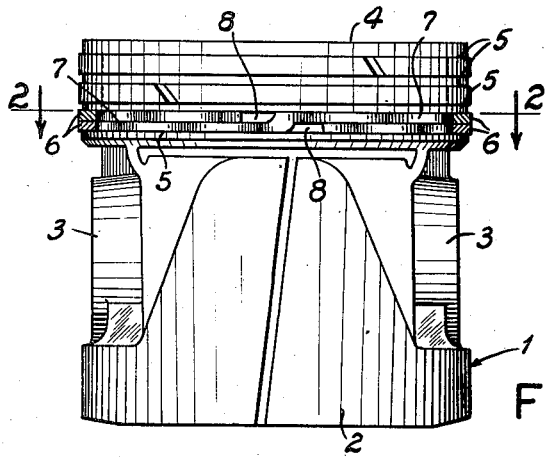
FIG. 5.
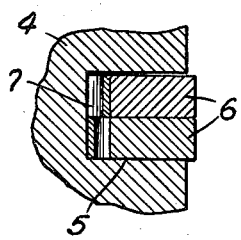
FIG. 3.
FIG. 4.
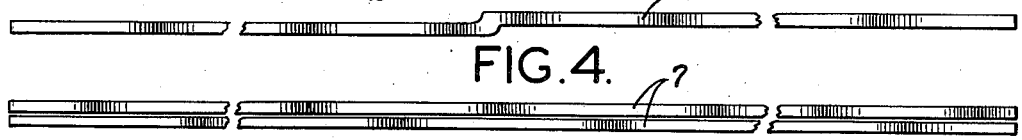
FIG. 2.
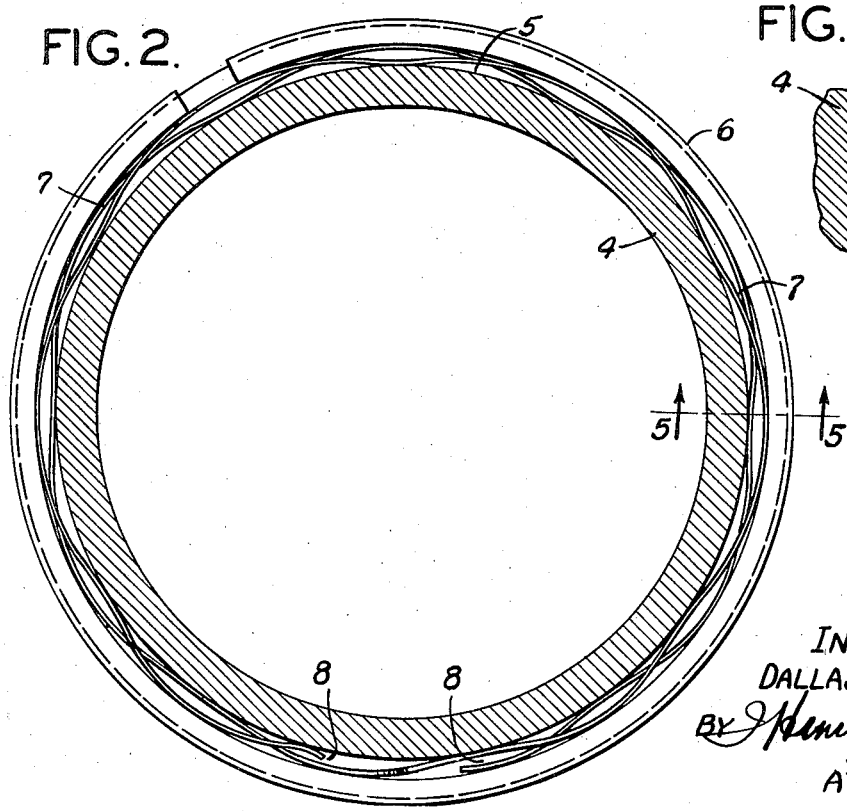
FIG. 6.
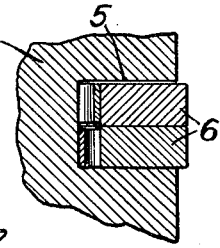
INVENTOR:
DALLAS M. SMITH
By Henry Kincely
ATTORNEY Patented Nov. 9, 1943

2,333,690

UNITED STATES PATENT OFFICE 2,333,690

RING EXPANDER

Dallas M. Smith, Kirkwood, Mo., assignor to McQuay-Norris Manufacturing Company, St. Louis, Mo., a corporation of Delaware Application January 6, 1940, Serial No. 312,758

4 Claims. (Cl. 309—43)

My invention relates to ring expanders and more particularly to ring expanders adapted for use with multiple-piece piston packings including a plurality of cylinder contacting members.

When a piston reciprocates in a cylinder of irregular bore, the ring members provided thereon and adapted to contact the cylinder wall expand and contract as they pass over the irregularities therein. To insure the effective removal of an adequate amount of oil from the cylinder wall, it is desirable that the ring members exert thereon a substantially high pressure per unit of contacting area and for this reason, ring expanders frequently are used to exert pressure on the ring members. The expanders usually are positioned between the rear faces of the ring members and the bottom of the ring groove.

Sinuous expanders as used heretofore usually were formed of material substantially as wide as the ring groove in which they were used and only a single turn was placed therein and engaged all the ring members in the ring groove. If radial expansion of one ring member was limited due to an irregularity in the cylinder wall, radial expansion of the expander was limited also by this ring member so that the expander no longer engaged the other ring members which expanded until they contacted the cylinder wall because of their inherent natural resiliency only. The pressure exerted by the ring members on the cylinder wall due to their inherent resiliency was much less than the pressure exerted thereon by the ring members when under the influence of the expander, and the ring members, therefore, failed to remove an adequate amount of oil from the cylinder wall and failed to provide an effective seal between the piston and the cylinder in which it reciprocated.

In order to overcome the deficiencies of ring expanders as used heretofore my invention contemplates a ring expander adapted for use in the ring groove of a piston and with a multiple-piece piston packing including a plurality of ring members adapted to contact the cylinder wall. The expander is positioned in the ring groove between the bottom thereof and the rear faces of the ring members, and the expander is formed of sinuously curved ribbon steel having a width substantially less than the width of the ring groove in which the expander is used so that a plurality of turns of the expander may encircle the piston and be positioned edge to edge in the ring groove and so that each turn may engage a ring member or group thereof whereby a ring member in engagement with one turn of the expander expands and contracts radially under the influence of the expander independently of a ring member in engagement with another turn of the expander.

An expander of the kind briefly described above expands each ring member or group thereof in engagement with one turn of the expander independently of the other ring members of the packing so that if radial expansion of one ring member or group thereof is limited by an irregularity in the cylinder wall, the other ring members not in engagement with the same turn of the expander as the restricted ring member expand under the influence of the expander until they contact the cylinder wall and thereby effectively remove oil therefrom. An expander of this kind insures a high pressure per unit of contacting area between all the ring members and the cylinder wall and provides an effective seal between the piston and the cylinder in which it reciprocates.

Having thus briefly described my invention one object thereof is to provide a ring expander which is cheap to manufacture and which furnishes an effective seal between the piston and the cylinder when used with a multiple-piece piston packing.

A more specific object of my invention is to provide an expander adapted for use with a multiple-piece piston packing having a plurality of ring members adapted to contact the cylinder wall and which expander exerts pressure on each ring member or group thereof independently of the other ring members of the piston packing.

Other objects and advantages will be apparent to those skilled in the art from the following description wherein reference is made to the drawing illustrating several embodiments of my invention and wherein similar reference numerals designate similar parts throughout the several views.

In the drawing, Fig. 1 is a side elevation of a piston provided with an expander constructed according to my invention.

Fig. 2 is a section on the line 2—2 of Fig. 1.

Fig. 3 is a developed view of the expander shown in Figs. 1 and 2.

Fig. 4 is a developed view of a second embodiment of my invention.

Fig. 5 is a detail section on the line 5—5 of Fig. 2; and

Fig. 6 is a view similar to Fig. 5 showing a detail sectional view of the second embodiment of my invention shown in developed form in Fig. 4.

Referring to the figures, a piston 1 is shown therein comprising a skirt 2, wrist pin bosses 3 and head 4 having formed therein the usual ring grooves 5 provided with a pair of resilient ring members 6 arranged to contact the cylinder wall and a ring expander 7 constructed according to my invention and positioned in the ring groove 5 between the bottom thereof and the rear faces of the ring members. It should be understood, however, that the piston and ring members are shown here for illustrative purposes only and constitute no part of my invention.

The expander 7 preferably is formed of ribbon steel which is bent sinuously inwardly and outwardly so that the inwardly curved portions engage the inner faces of the ring members 6 and the outwardly curved portions engage the bottom of the ring groove 5. The width of the expander 7 is substantially less than the width of the ring groove 5 so that a plurality of rings or turns of the expander may encircle the piston 1 and be positioned edge to edge in the ring groove. The expander 7 preferably is arranged therein so that each ring or turn engages only one ring member 6 and so that the sinuous curves of adjacent rings or turns are not in registry axially with each other. In this manner the several rings or turns of the expander 7 are prevented from moving axially in the ring groove 5 relative to each other and one ring or turn of the expander cannot engage an adjacent ring or turn thereof to limit radial expansion of either ring or turn of the expander.

In order that each ring or turn of the expander 7 may expand and contract freely with the ring members 6 and independently of the other rings or turns of the expander as the ring members pass over irregularities in the cylinder wall, each ring or turn of the expander has a gap 8 between the ends thereof.

The embodiment shown in developed form in Fig. 3 consists of two rings or turns joined edge to edge near the ends thereof and adjacent the gaps 8 therein. The embodiment shown in developed form in Fig. 4 consists of two rings which are separate from each other and preferably are installed in the ring groove independently of each other.

As stated above, an expander 7 constructed according to my invention exerts pressure on each ring member 6 independently of the other and irregularities encountered in the cylinder wall by one ring member do not influence substantially the pressure exerted by the expander on the other member.

Other arrangements may be used without deviating from the scope of my invention, and while I described several embodiments of my invention, it is evident that the constructions may be varied in many particulars, and I do not limit myself to the forms and arrangements shown and described. For instance, any number of ring members 6 and rings or turns of the expander 7 may be used and the ring members 6 may be arranged in groups if desired and each group may contact a single ring or turn of the expander. Also, instead of joining the turns of the expander 7 at the ends thereof adjacent the gaps 8 therein the turns of the expander may be joined together at any point or points thereof. The expander 7 need not have the exact shape as the embodiments shown in the drawing since any sinuously curved expander may be used.

What I claim as new and desire to secure by Letters Patent, is:

1. An expander for piston rings, comprising, a band of resilient ribbon material of a length such as to constitute at least nearly two turns, said ribbon being sinuously waved and having an offset therein approximately one turn from an end thereof, said offset amounting to substantially the axial width of the ribbon.

2. An expander for piston rings, comprising, a band of resilient ribbon material of a length such as to constitute at least nearly two turns, said ribbon being sinuously waved and having an offset therein approximately one turn from an end thereof, said offset amounting to substantially the axial width of the ribbon, and the waves in one turn being out of registry with the waves of the adjacent turn.

3. A ring expander of sinuously curved ribbon steel comprising a pair of turns offset from each other and joined together at their ends to form a continuous band, adjacent turns of said expander being positioned edge to edge and in engagement at spaced points throughout the length of the expander, said expander being formed and arranged so that the sinuous curves of adjacent turns of said expander are out of registry with each other and each turn of said expander being adapted to expand and contract substantially independently of the other.

4. A ring expander formed of ribbon material sinuously waived and comprising a pair of turns arranged one above the other in edge-to-edge contact at a series of points, portions of said turns between said points of contact being out of registry.

DALLAS M. SMITH.